Nov. 13, 1923. 1,474,209
R. V. R. REYNOLDS
GAUGE
Filed Oct. 14, 1921
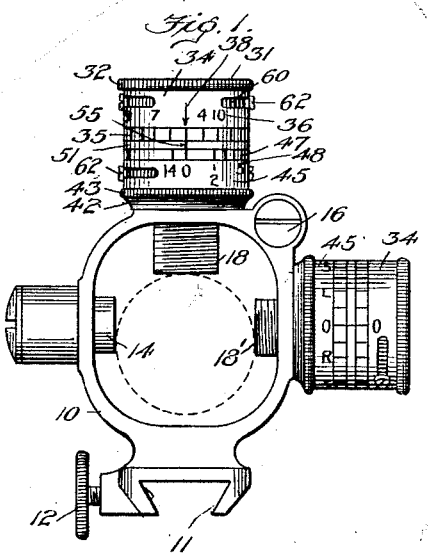
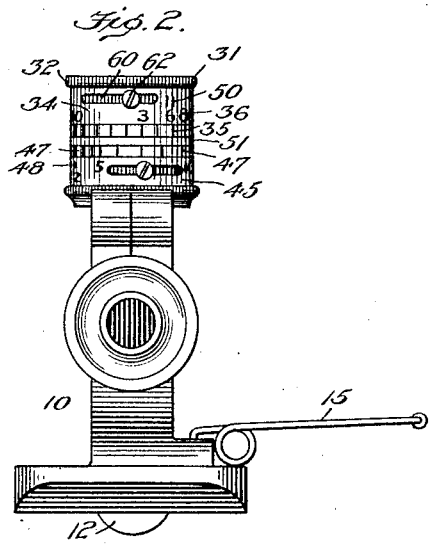
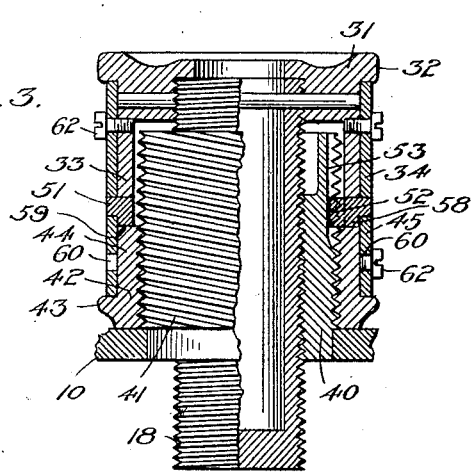
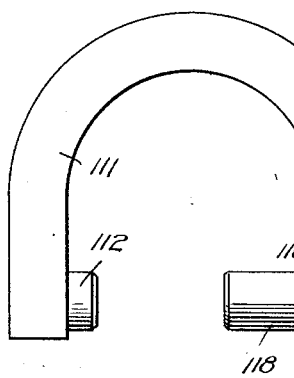
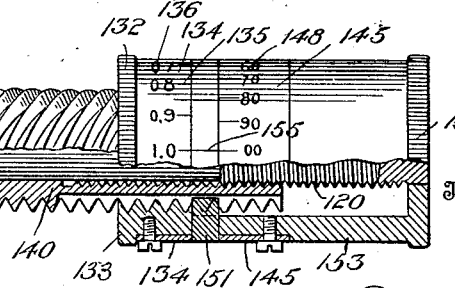
By Robert V. R. Reynolds
Church & Church *his Attorneys*

Patented Nov. 13, 1923.

1,474,209

UNITED STATES PATENT OFFICE.

ROBERT V. R. REYNOLDS, OF WASHINGTON, DISTRICT OF COLUMBIA.

GAUGE.

Application filed October 14, 1921. Serial No. 507,693.

*To all whom it may concern:*

Be it known that I, ROBERT V. R. REYNOLDS, a citizen of the United States, residing at Washington, in the District of Columbia, have invented certain new and useful Improvements in Gauges; and I do hereby declare the following to be a full, clear, and exact description of the same, reference being had to the accompanying drawings, forming part of this specification.

This invention relates to gauges, and particularly to an addition to a gauge or other measuring instrument which requires more than one revolution of its screw, which addition will prevent error in the setting of the gauge by limiting the movement of the screw in one direction and by indicating, as by a space, an incorrect setting of the screw in the opposite direction.

In the principal embodiment illustrated, the invention is shown in connection with the windage and elevation screws in a telescope mounting for a sharpshooter's rifle, which embodiment of the invention has been found to be of extreme usefulness, relieving the markman's mind of all uncertainty as to whether or not one of his adjustments has been set an entire revolution from the correct position. When my improved gauges are used on a telescope sight mount neither elevation nor windage can be set incorrectly without the error being apparent.

The invention must not be considered, however, as limited to gun sights, since it is of much broader scope and pertains generally to gauges used for any purpose whatsoever, as for example, in the usual micrometer for determining the diameter or thickness of objects, as shown in Fig. 4.

In the drawings,—

Figure 1 is an elevation of a telescopic mount adapted for use with the standard U. S. Army rifle and embodying two gauges in accordance with my invention.

Fig. 2 is a side elevation thereof.

Fig. 3 is a vertical section through the center of one of the gauges.

Fig. 4 is an elevation, partly broken away, of a caliper embodying my invention.

In Figs. 1 to 3, showing a telescope mount, the frame 10 is of ordinary construction as regards the dove-tail groove 11 to engage the rifle, the set screw 12 which fastens it to the rifle, the spring pressed plunger 14 acting in opposition to the windage screw, the spring pressed bail 15 acting in opposition to the elevation screw, and the clamp screw 16 which draws together the split portions of the frame and thereby tightens or clamps the windage and elevation screws as desired.

The elevation screw 18 and the windage screw 19 are each standard Winchester screws having forty threads to the inch, so that one revolution of the screw will alter the axis of the telescope relative to the bore twelve and one-half minutes of arc or twenty-five half-minutes, a half-minute corresponding to a thousandth of an inch movement when the two bases of the sight are placed seven and three-sixteenths inches apart, as is common practice. A change of a minute in the setting of the telescope would therefore make a difference of an inch at a hundred yards, or a change of one minute in windage would equal approximately a quarter of a point.

The spindle or screw 18 is threaded into the barrel described in the next paragraph and carries at its top a disk 31 having a knurled periphery 32 and a cylindrical skirt 33, on which is mounted a band 34 carrying a scale divided into twenty-five equal parts, each part being indicated by a line 35, many of which have just over them numerals such as 36 indicating hundreds of yards. The zero mark of the scale is indicated by the usual feather 38.

A hollow post or barrel 40 permanently secured to the frame coaxial with the screw 18 is threaded on its outer cylindrical surface with a comparatively steep thread 41 so cut that the reading nut 42 will make but one complete revolution for the maximum range of the instrument. This reading nut 42 has a knurled periphery 43 corresponding to the knurled edge 32 of the elevation screw and has an upstanding cylindrical skirt 44 carrying a graduated band 45. This band is graduated to hundreds of yards, the graduations 47 being calculated in mathematical accordance with ordnance tables, and being numbered as at 48 to indicate hundreds of yards. It will be noted that these numerals 48 run in regular order around the band 45, but the distances between them increase with the range in accordance with laws of ballistics. The graduations of the upper band 34 are equally spaced, but the numerals 36 are apparently disordered, due to the fact that the scale is overlapped, and therefore makes a number of revolutions about the band. Hence for X yards range the screw would be elevated Y revolutions plus Z graduations of one-half minute each. For certain ranges the same graduations 35 will be used, but the screw will be turned a different number of revolutions for each, this fact accounting for some of the double numbers such as 50 on the upper scale.

A zero indicating washer 51 is loosely mounted on the barrel 40 and has a tongue or spline 52 snugly fitting within a groove 53 on one side of the barrel 40, this preventing rotation of the washer while permitting its free travel up and down. The peripheral surface of the washer is perfectly plain except for the single mark or graduation 55 extending from top to bottom of the washer, this graduation serving as a pointer for reading both of the scales. For convenience the washer is of equal diameter with the two scale bands 34 and 45, and to increase the bearing surface without adding to the overall height of the gauge, the washer is provided with a reduced portion 58 fitting within a corresponding recess 59 in the reading nut 42.

In order to set the device for a chosen range such for example as 1300 yards, the screw is elevated by means of its knurled edge 32 until it is somewhat above what is believed to be the 1300 elevation. This, it will be noted, requires a number of complete turns of the screw, but no notice need be taken of the graduations during this part of the operation. The reading nut 42 is now turned on its steeply threaded barrel 40 until the numeral 13, corresponding to 1300 yards, is in registry with the zero graduation 55 of the washer, this washer having risen with the reading nut 42. The elevation screw is now lowered until it comes into light contact with the washer 51 whereupon the graduation 35 bearing the numeral 13 above it will be found in close relation to the zero mark 55 on the washer. A slight turn of the screw, up or down, will now bring the graduation 35 in exact registry with the zero mark of the washer, and the process is completed with micrometer exactness.

It is quite obvious that the accurately cut low pitch screw 18 cannot be set at a revolution below the proper setting as it cannot pass the reading nut 42, and it is equally apparent that if the proper graduation of the elevation screw scale should be brought in registry with the zero mark 55 one or two revolutions above the correct one the marksman would instantly notice the large gap between the washer and the upper band 34. In practice the screw will never be set too high because the binding of the parts as they come into contact is an unfailing signal that the screw is on the right revolution.

The windage gauge is of exactly the same construction as the elevation gauge just described, save that the scale 45 of the windage nut is graduated in full "points" right and left of zero windage while the scale 34, which is connected to the low pitch screw 18′, is graduated into twenty-four equal parts, (instead of twenty-five) each of the graduations corresponding to an eighth-point of windage, or approximately half a minute of angle. The theoretical error arising from the division of the windage scale to twenty-four parts instead of twenty-five is so slight in comparison with the unknown errors arising from shifting winds that it need not be considered in practice.

An important feature of the invention lies in the ability to adjust the scale bands to allow for discrepancies between the sight bases and the bore of the rifle, or within the telescope sight, or the personal equation of the marksman. More accurately stated, this adjustment compensates the sum of these three errors. Each of the bands is adjustable with respect to its skirt. A preferred way to accomplish this is to slot the band at diametrically opposite points, such as 60 to permit the passage of the shank of the set screws 62 which are threaded into the skirt, while their heads bind against the band to hold it in adjusted position.

To adjust for range and zero windage: Bore-sight the rifle upon a distant object with the telescope in place, and by means of the two micrometers bring the cross hairs to bear upon the same object. Next raise the elevation micrometer the proper number of half-minutes for the distance at which test firing is to be conducted. Fire a number of carefully aimed shots at the range selected for test, moving the micrometers until the group is well centered. Using the Springfield rifle five or six hundred yards are good test ranges. A windless day should be selected, or else allowance must be made for wind in setting the graduated band of the windage micrometer. Clamp both micrometers by setting up the screw 16 which compresses the slit in the frame. Next, if shooting at 500 yards, loosen the graduated band of the elevation micrometer and set it fast with the figure 5 over the zero mark. Turn the nut 42 up snugly against the micrometer skirt or thimble and adjust the graduated band on it so that the 5 stands below the zero mark. The elevations are then set for all ranges.

Adjust the windage by loosening the graduated band of the wind micrometer and bringing its zero opposite the zero mark. The windage indicator is set similarly with its zero opposite the zero mark, unless allowance must be made for existing side wind. The clamp screw in the frame may then be loosened sufficiently to allow the micrometer screws to turn with moderate effort. They should not be loose.

In Fig. 4 the invention is shown as applied to a micrometer caliper the principle being exactly the same as in the elevation or windage gauge in the other figures. The frame 110 is continued by a bow 111 having at its free end an anvil 112 cooperating with the spindle 118 which has a threaded portion 120 engaging the barrel 140. The barrel 140 is integral with the frame and is internally threaded to low pitch and is externally threaded to a high pitch, the screw 120 engaging the low pitch threads while the reading nut 133 moves along the high pitch threads, being manually turned by its knurled periphery 132. The nut carries an adjustable band 134 upon which are engraved the graduations 135 and cooperating numerals 136, in this case giving for example inches and tenths.

The washer 151 carries one or more splines to prevent it from rotating on the barrel 140 and bears a zero graduation 155 against which the numerals 136 and the corresponding numerals 148 on the band 145 are read. The spindle 118 is provided with a thimble 153 having a knurled edge 152 and being of the same diameter as the graduated portion of the reading nut.

In using the caliper shown the spindle 118 will be moved until the object to be measured is gripped between the spindle and anvil, suitable friction means being interposed which are not shown since they are familiar in the art and form no part of the invention. The reading nut is now turned until it binds the washer 151 between it and the thimble at which time the distance between the anvil and spindle will be shown without necessity for any calculation, inches and tenths being shown in plain figures on the reading nut while hundredths and thousandths of inches will be read direct on the thimble and ten thousandths may be calculated since it is preferred to graduate the thimble in a hundred equal parts and to graduate the reading nut to read in tenths of inches, the number of such numerals varying with the size of the caliper, the nut 133 making but one turn to run from zero to the maximum capacity of the instrument.

What is claimed is:

1. In a device of the character described, a barrel, a screw therein and a nut thereon, a scale carried by said screw, and a cooperating scale carried by said nut, each of said scales being adjustably mounted.

2. In a device of the character described, an exteriorly and interiorly threaded barrel, a screw within said barrel, a nut on the outside of said barrel, and a circumferentially adjustable circular band mounted on said nut.

3. In a device of the character described, a pair of rotatable members, a non-rotatable member having a graduation thereon and adapted to be gripped between said members, and a scale on each rotatable member cooperating with said graduation to give a reading.

4. In a device of the character described, a pair of rotatable members, an overlapped scale on one of said members and a cooperating checking scale on the other of said members, whereby an error in setting the overlapped scale may be detected.

5. In a device of the character described, an externally and internally threaded barrel, a screw mounted within said barrel, a thimble on said screw, a nut on said barrel, a washer loosely mounted on said barrel between said thimble and said nut, and means for preventing rotation of said washer with respect to said barrel.

6. In a device of the character described, a frame, a screw mounted for rotation and longitudinal movement with respect to said frame, a scale carried by said screw, a washer coaxial with said screw, and means on said washer cooperating with said scale for indicating a distance.

7. In a device of the character described, a frame, a threaded spindle mounted therein, a graduated thimble carried by said spindle, a threaded barrel carried by said frame, a graduated reading nut on said barrel, and a zero indicating washer splined to said barrel and cooperating with the graduations on the thimble and the nut for indicating a distance.

8. In a device of the character described, a threaded screw mounted therein the pitch of said threads being comparatively low, an externally threaded barrel, the thread of said barrel being of comparatively high pitch, a thimble carried by said spindle, a reading nut carried by said barrel, and a loosely mounted washer splined to said barrel and adapted to be gripped between said nut and said thimble.

9. In a telescopic mount for rifles, an open frame receiving therein the telescope, a rotatable, adjustable stop nut scaled for windage at the side of said frame, a rotatable scaled adjustable stop nut at the top of said frame, a windage scaled adjusting screw mounted in said frame concentric with the side stop nut, and an elevation scaled adjusting screw engaging said telescope and movable coaxially with the stop nut at the top of the frame.

10. In a telescope mount for rifles, an open frame adapted to receive the telescope and to be attached to the rifle barrel, a manually operated low pitch screw for adjusting the position of the telescope in said frame, a scale carried by said screw, and means for preventing the erroneous setting of the screw by an entire revolution in one direction and for indicating an erroneous setting in the opposite directon.

11. In a telescopic mount for rifles, a barrel having an external thread of high pitch and an internal thread of low pitch, a reading nut mounted on said barrel, a washer loosely mounted on said barrel and adapted to rest by gravity on said reading nut, means for preventing rotation of said washer, a cylindrical member adapted to bind said washer against said reading nut and a screw engaging said low pitch thread of said barrel and rigidly secured to said cylindrical member, said reading nut having an irregular scale consecutively numbered and said cylindrical member having a regular scale irregularly numbered.

12. In a telscope mount for rifles, an open frame adapted to receive a telescope, an exteriorly and interiorly threaded barrel mounted on said frame, a screw within said barrel and adapted to engage the telescope, a nut on said barrel, and an angularly adjustable circular band on said nut.

13. In a telescope mount for rifles, a frame a pair of threaded members engaging said frame, a non-rotatable member having an index mark thereon and adapted to be gripped between said members, and a scale on each threaded member cooperating with said graduation to give a reading when so gripped.

14. In a telescope mount for rifles, a frame adapted to guide a telescope, a pair of rotatable members supported by said frame, an overlapped scale on one of said members and a cooperating checking scale on the other of said members whereby an error in reading or setting the overlapped scale may be detected.

15. In a device of the character described, a frame adapted to receive therein an object, a manually operated low pitch screw engaging a threaded opening in said frame for contacting with said object when in said frame, a scale carried by said screw, and means for preventing the erroneous setting of the screw by an entire revolution in one direction and for indicating an erroneous setting in the opposite direction.

ROBERT V. R. REYNOLDS.